US012053994B2

(12) United States Patent
Buthrath et al.

(10) Patent No.: US 12,053,994 B2
(45) Date of Patent: Aug. 6, 2024

(54) PRINTER, PRINTER CONTROL METHOD AND PROGRAM

(71) Applicant: SATO HOLDINGS KABUSHIKI KAISHA, Tokyo (JP)

(72) Inventors: Nuttawuth Buthrath, Tokyo (JP); Kota Wakabayashi, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 17/425,825

(22) PCT Filed: Mar. 24, 2020

(86) PCT No.: PCT/JP2020/013014
§ 371 (c)(1),
(2) Date: Jul. 26, 2021

(87) PCT Pub. No.: WO2020/196519
PCT Pub. Date: Oct. 1, 2020

(65) Prior Publication Data

US 2022/0169039 A1 Jun. 2, 2022

(30) Foreign Application Priority Data

Mar. 25, 2019 (JP) ................................. 2019-057433
Mar. 23, 2020 (JP) ................................. 2020-050867

(51) Int. Cl.
*B41J 3/407* (2006.01)
*B41J 11/00* (2006.01)

(52) U.S. Cl.
CPC ......... *B41J 3/4075* (2013.01); *B41J 11/0095* (2013.01)

(58) Field of Classification Search
CPC ...... B41J 3/4075; B41J 11/0095; B41J 11/42; B65H 26/02; B65H 2220/01; B65H 2403/942; B65H 2557/61; B65H 2701/1311; B65H 2701/194
See application file for complete search history.

(56) References Cited

U.S. PATENT DOCUMENTS 9,457,925 B1 * 10/2016 Harashina ................. B65C 9/40
2016/0349685 A1 12/2016 Kato et al.

FOREIGN PATENT DOCUMENTS

CN 101293604 A * 10/2008 ............... B65H 7/14
JP 2013-189284 A 9/2013

* cited by examiner

*Primary Examiner* — Anh T Vo
(74) *Attorney, Agent, or Firm* — Foley & Lardner LLP

(57) ABSTRACT

The printer is a printer for printing on a label continuous body including a label detecting unit having a light-emitting portion configured to emit a detecting light and a light-receiving portion configured to receive the detecting light and a control unit configured to adjust a light emitting output of the detecting light in the light-emitting portion, so as to bring an output voltage from the label detecting unit when the light-receiving portion receives a detecting light through the liner to which the label is not temporarily attached, closer to an output voltage from the label detecting unit when the light-receiving portion receives a detecting light through a state in which there is no label continuous body between the light-emitting portion and the light-receiving portion.

14 Claims, 8 Drawing Sheets

PRINTER, PRINTER CONTROL METHOD AND PROGRAM

TECHNICAL FIELD

The present invention relates to a printer, a printer control method and a program.

BACKGROUND ART

In a printer disclosed in JP2013-189284A for printing on labels temporarily attached to a belt-like liner, for example, a optical sensor for detecting reflection or transmission of a detecting light is used as a detection sensor for detecting a label.

A reflection factor or a transmission factor of the detecting light is affected by materials, color and thickness of the label. For this reason, the printer disclosed in JP2013-189284A includes a plurality of light emitting elements having different amount of luminescence and a plurality of light receiving elements having different receiving sensitivity, respectively, so as to adapt to differences in the materials and colors of labels, and an optimal output level of the optical sensor is adjustable by changing the combination of the light emitting element and the light receiving element.

SUMMARY OF INVENTION

However, as the materials, colors and thickness of labels are becoming more diverse, it tends to become difficult to detect an end portion of the label with high-accuracy in the above technique.

The present invention has an object to increase the detection accuracy of labels in the printer of printing on labels temporarily attached to a continuous body of the belt-like liner.

According to one aspect of the present invention is directed to a printer for printing on a label continuous body including a label temporarily attached to a belt-like liner, including a label detecting unit having a light-emitting portion configured to emit a detecting light and a light-receiving portion configured to receive the detecting light, and a control unit configured to adjust a light emitting output of the detecting light in the light-emitting portion, so as to bring an output voltage from the label detecting unit when the light-receiving portion receives a detecting light through the liner to which the label is not temporarily attached, closer to an output voltage from the label detecting unit when the light-receiving portion receives a detecting light through a state in which there is no label continuous body between the light-emitting portion and the light-receiving portion.

With this aspect of the present invention, the light emitting output of the detecting light is adjusted so that the output voltage from the detection unit when the detecting light is received through the liner to which the label is not temporarily attached is close to the output voltage when the detecting light is received through the state in which there is no label continuous body between the light-emitting portion and the light-receiving portion. And, the output voltage of the detecting light through the label is also reduced. As a result, unnecessary diffusion and reflection of detecting light due to the materials and colors of labels are suppressed, making it easier to detect changes in the detecting light in the light-receiving portion. Therefore, the detection accuracy of the label can be improved.

DESCRIPTION OF EMBODIMENTS

An embodiment of the present invention will be described below by referring to the attached drawings.

[Explanation of a Printer Configuration]

Figure 1:
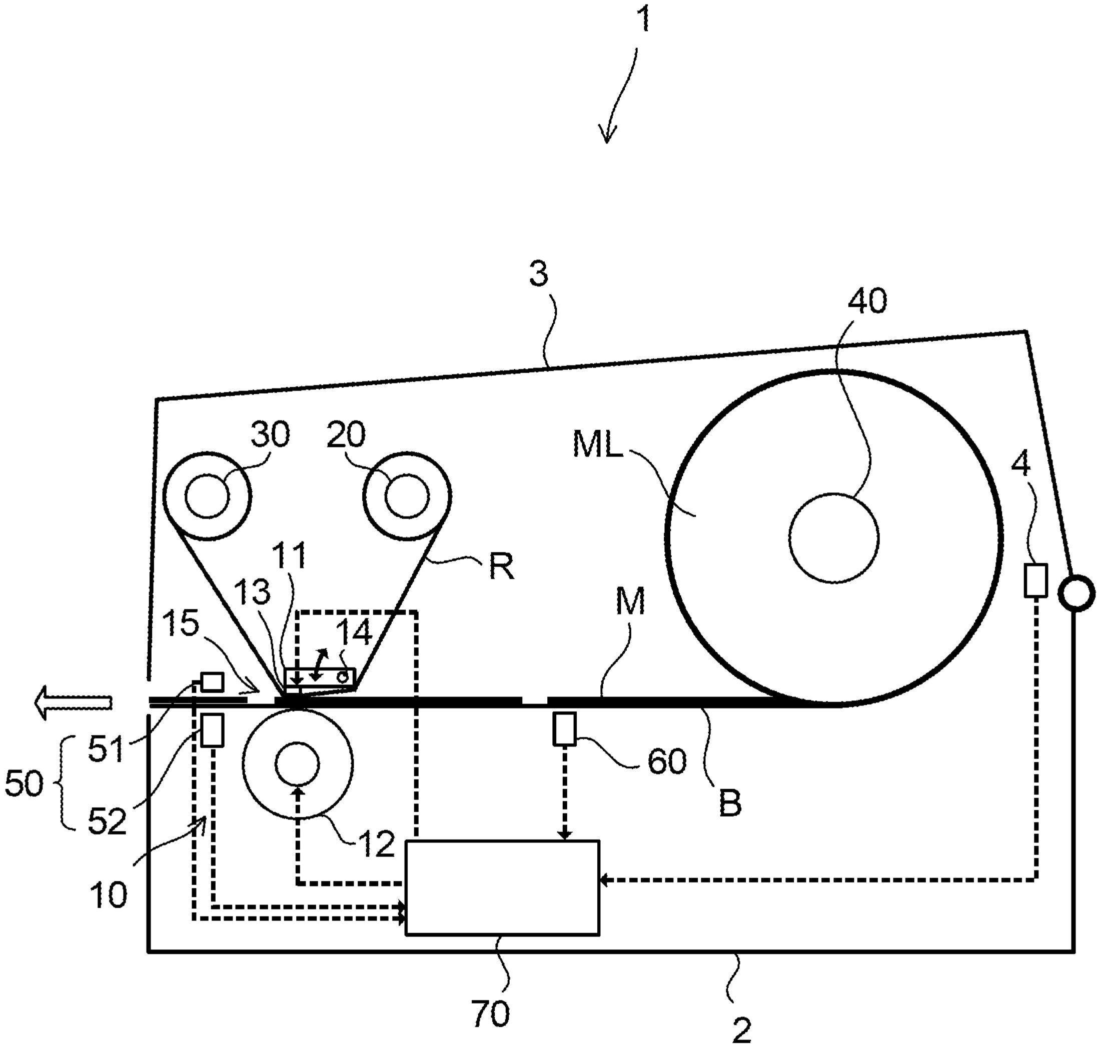
FIG. 1 illustrates a schematic configuration diagram of a printer according to an embodiment of the present invention.

FIG. 1 illustrates a schematic configuration diagram of a printer 1 according to an embodiment of the present invention.

The Printer 1 prints variable information such as prices, bar codes, other commodity information, and management information relating to articles or services on a print medium based on a medium issuing instruction, and is a thermal transfer printer that printing is performed by transferring ink of a ink ribbon R to the print medium by heating the ink ribbon R.

In the present embodiment, as the print medium, a plurality of labels M on a belt-like liner B are temporarily attached continuously at predetermined intervals, a label continuous body wound in a roll shape (hereinafter, referred to as continuous body ML) is applied.

The printer 1, as illustrated in FIG. 1, includes a printing unit 10, a ribbon rewinding shaft 20, a ribbon winding shaft 30, a medium feeding shaft 40, a label detecting unit 50 for detecting the label M, a pitch detecting unit 60 for detecting a spacing (pitch) between labels M, and a controller 70 as a control unit.

Each of the above configurations is housed in a printer main body 2 and covered by a cover 3 which is openable and closable mounted with respect to the printer main body 2. Further, the cover 3 is provided with an opening/closing detecting sensor 4 for detecting opening and closing of the cover 3. As the opening/closing detecting sensor 4, an optical sensor having a light-emitting portion and a light-receiving portion, or a physical sensor or the like is switched on and off if the cover 3 is opening and closing, can be applied.

The printing unit 10 comprises a head unit 11 and a platen roller 12, performs to print on the label M and to feed the continuous body ML and the ink ribbon R.

The head unit 11 holds a thermal head 13 in a state of a heater element of the thermal head 13 exposed from a lower surface. The platen roller 12 is disposed just below the thermal head 13 and constitutes a printing portion 15 for printing to the label M together with the thermal head 13.

The head unit 11 is supported by a supporting shaft 14, is swingable in the direction of the arrow illustrated in FIG. 1, by the supporting shaft 14. The head unit 11 is movable into a head opening position where the thermal head 13 is spaced from the platen roller 12 and into a head closing position where the thermal head 13 abuts the platen roller 12. In FIG. 1, the head unit 11 is positioned at the head closing position.

The platen roller 12 is rotatably driven by a stepping motor which is not illustrated in the figure and is capable of driving to regular rotation or to reverse rotation according to an instruction signal from the controller 70.

The ribbon rewinding shaft 20 holds the ink ribbon R supplied to the printing portion 15 in a rolled form. The Ink ribbon R fed from the ribbon rewinding shaft 20 to the printing portion 15 is nipped between the thermal head 13 and the platen roller 12.

The medium feeding shaft 40 holds the continuous body ML supplied to the printing portion 15 in the rolled form. The continuous body ML fed from the medium feeding shaft 40 to the printing portion 15 is nipped with the ink ribbon R between the thermal head 13 and the platen roller 12.

The used ink ribbon R is wound around an outer circumference of the ribbon winding shaft 30 as the ribbon winding shaft 30 rotates due to the gear connection with the stepping motor. Incidentally, when the head unit 11 is in the head opening position, only the ink ribbon R can be fed in the winding direction by rotating the ribbon winding shaft 30.

In state that the label M and the ink ribbon R are nipped between the thermal head 13 and the platen roller 12, when a current provides to the heater element of the thermal head 13, heating of the heater element heat transfers the ink of the ink ribbon R to the label M, as a result, printing to the label M is performed. Further, when the platen roller 12 is rotated to regular rotation by the stepping motor (not illustrated), the continuous body ML is fed to the downstream side (in the direction of the white arrow). In addition, to feeding the continuous body ML to the downstream side is referred to as "forward feeding", and to feeding the continuous body ML to upstream side is referred to as "back feeding".

The label detecting unit 50 has a light-emitting portion 51 for emitting a detecting light and a light-receiving portion 52 for receiving the detecting light, and is constituting a transmission optical sensor. The label detecting unit 50 outputs an output voltage based on the detecting light received through the continuous body ML in the light-receiving portion 52 to the controller 70. In the present embodiment, the label detecting unit 50 is disposed at downstream side of the printing unit 10.

The light-emitting portion 51 has multiple levels of a light emitting output of the detecting light, for example, 128 levels in the present embodiment, and the light emitting output can be adjusted according to the control by the controller 70.

The light-receiving portion 52 includes a plurality of stages of a receiving sensitivity for receiving the detecting light from the light-emitting portion 51, the receiving sensitivity is adjustable according to the control by the controller 70. The light-receiving portion 52 is disposed at a position facing the light-emitting portion 51.

In the pitch detecting unit 60, the value of the output voltage can be adjusted by changing the receiving sensitivity in the light-receiving portion 52 while keeping the light emitting output from the light-emitting portion 51 constant. And also, the value of the output voltage can be adjusted by changing the light emitting output from the light-receiving portion 51 while keeping the receiving sensitivity at the light-receiving portion 52 constant. Further, the value of the output voltage can also be adjusted by changing both the light emitting output of the light-emitting portion 51 and the receiving sensitivity of the light-receiving portion 52.

The pitch detecting unit 60 includes a reflective sensor that detects an eye-mark (not illustrated in FIG. 1) that is preprinted at the same pitch as the arrangement pitch of labels M on an opposite surface to the surface on which labels M is temporarily attached in the liner B. This allows a printing start position of the label M correspond to printing portion 15 to be identified when issuing the label M sequentially.

The controller 70 consists of a microprocessor, storage devices such as a ROM and a RAM, an input/output interfaces, and a bus for connecting these, and the like, which will be described later.

The controller 70, based on a control program, adjusts the light emitting output of the detecting light in the light-emitting portion, so as to bring an output voltage from the label detecting unit 50 when the light-receiving portion 52 receives a detecting light through the liner B to which the label M is not temporarily attached, closer to an output voltage from the label detecting unit 50 when the light-receiving portion 52 receives a detecting light through a state in which there is no label continuous body ML between the light-emitting portion 51 and the light-receiving portion 52.

Specifically, the controller 70 adjusts the light emitting output at the light-emitting portion 51 based on the control program so that the output voltage from the label detecting unit 50 becomes a specific value when a detecting light is received through the label M.

The controller 70 also changes the threshold value of the output voltage from the label detecting unit 50 for determining the label M has been detected based on the control program. The controller 70 can be set as a threshold value, for example, to the half-value of the specific value above.

Figure 4:
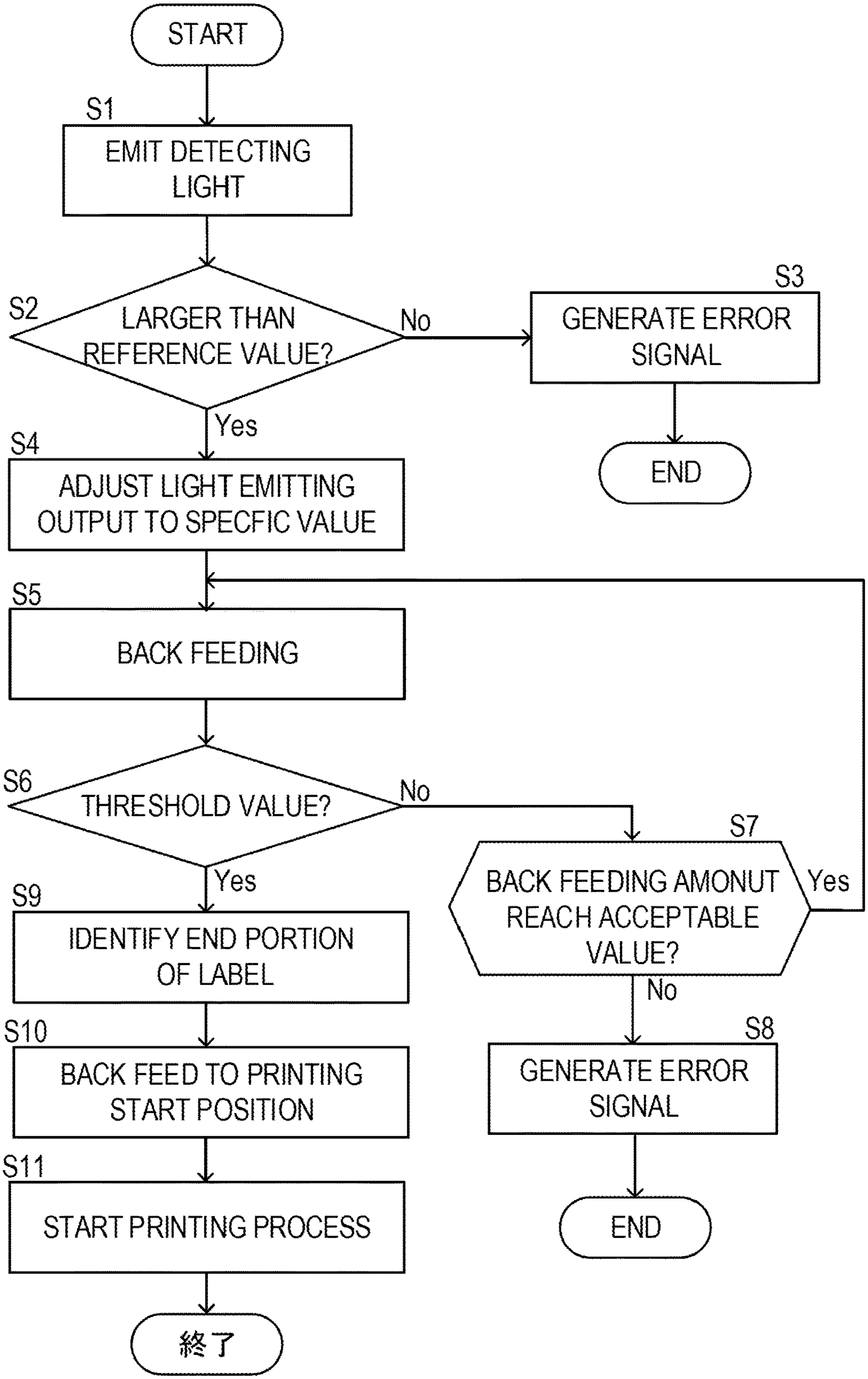
FIG. 4 illustrates a flowchart illustrating a first control of the label detecting unit according to the printer according to the embodiment of the present invention.

The specific value and the threshold value are explained together with the flowchart that explains the control of the label detecting unit 50 by printer 1 illustrated in FIG. 4.

[Explanation of a Controller Functional Configuration]

Figure 2:
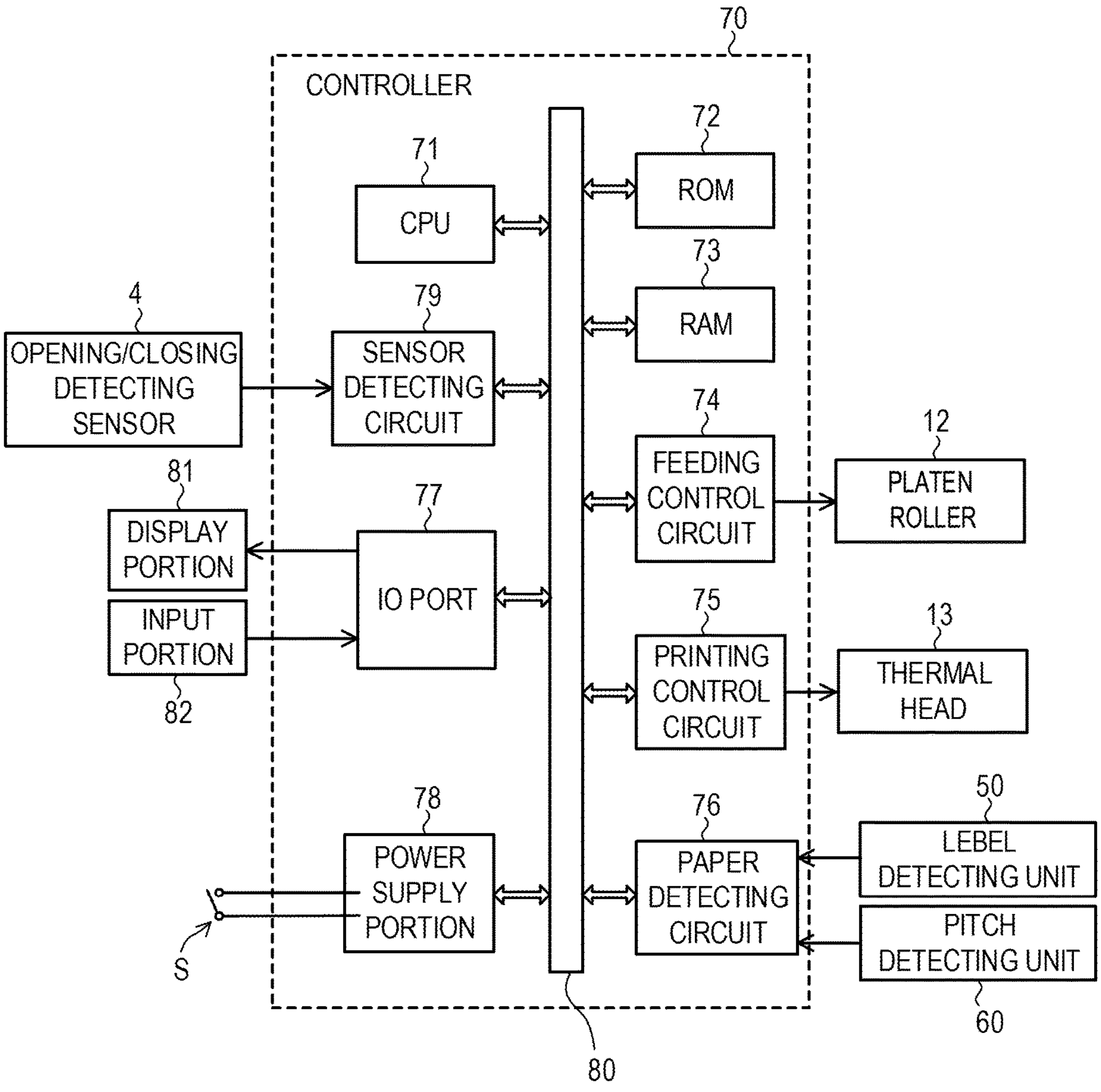
FIG. 2 illustrates a block diagram of the printer according to the embodiment of the present invention.

FIG. 2 illustrates a block diagram of the controller 70 according to the present embodiment.

The controller 70 is a computer including a CPU (central processing unit) 71, a ROM (read only memory) 72, a RAM (random access memory) 73, and the like, in addition to these, and further including a feeding control circuit 74, a printing control circuit 75, a paper detecting circuit 76, an IO port 77, a power supply portion 78, and a sensor detecting circuit 79. These are connected to each other via an internal bus 80, and these are equipped with a configuration that allows them to send and receive various data to each other.

The CPU 71 controls the entire controller 70 in a comprehensive manner by executing the above control program stored in the ROM 72, and also causes each part to perform the required processing and control.

The ROM 72 stores the control program or the like which are read and executed by the CPU 71. The ROM 72 stores the control program, the control program that causes the CPU 71 to execute the process for adjusting the light emitting output of the detecting light in the light-emitting portion, so as to bring an output voltage from the label detecting unit 50 when the light-receiving portion 52 receives a detecting light through the liner B to which the label M is not temporarily attached, closer to an output voltage from the label detecting unit 50 when the light-receiving portion 52 receives a detecting light through a state in which there is no label continuous body ML between the light-emitting portion 51 and the light-receiving portion 52.

Further, the ROM 72 stores the control program that causes the CPU 71 to execute the process for performing the back feeding or the forward feeding of predetermined steps so as to irradiate the detecting light to specified position of the continuous body ML after detecting the end portion Mf (refer to FIG. 3) on the downstream side of the feeding direction of the label M by using the detecting light before adjusting the light emitting output.

The RAM 73 stores various information necessary for the processing executed by the CPU 71, a print data required for printing, a print format, and a registration information or the like.

The feeding control circuit 74 controls the stepping motor that drives the platen roller 12 according to the instruction signal from the CPU 71, and controls the rotation/stop of the platen roller 12. Thus, the platen roller 12 is controlled to drive the "forward feeding" or "back feeding" of the continuous body ML in the paper conveyance path. Also, the counting of step of regular rotation or reverse rotation of the stepping motor is configured to be counted.

The printing control circuit generates printing signals corresponding to the printing data such as characters, figures and barcodes to be printed supplied from the CPU 71, and supplies the generated printing signals to the thermal head 13. Thus, the printing is performed on the label M.

The paper detecting circuit 76 provides the CPU 71 with the information detected by the label detecting unit 50. Or, the paper detecting circuit 76 supplies the information obtained by the pitch detecting unit 60 to the CPU 71. The CPU 71 controls the feeding of the continuous body ML and the ink ribbon R by the feeding control circuit 74 based on the information from the paper detecting circuit 76, and also controls the timing of printing by the thermal head 13 to execute printing on the label M.

The IO port 77 is connected to the display portion 81 and the input portion 82, and outputs the display data supplied from the CPU 71 to the display portion 81. The IO port 77 also sends to the CPU 71 an operating signal corresponding to operation input by user through the input portion 82.

The display portion 81, for example, consists of a liquid crystal display. The input portion 82 consists of the touch panel, buttons, DIP-SW or the like, provided in the display portion 81.

The power supply portion 78 monitors the pressing operation on the power switch S and switches the power supply to the printer 1 ON/OFF by implementing and stopping the power supply to each portion based on the operation of the power switch S.

The sensor detecting circuit 79 supplies information on the opening/closing of the cover 3 from the opening/closing detecting sensor 4 to the CPU 71. The CPU 71 can start executing the process of adjusting the output voltage in the label detecting unit 50 upon receiving the information from the sensor detecting circuit 79 that it has shifted from "open" to "closed".

The controller 70 illustrated in FIG. 2 can also be composed of a plurality of CPUs. The controller 70 illustrated in FIG. 2 can also be composed of a plurality of CPUs.

Next, printing on the label M and feeding the continuous body ML in the printer 1 will be explained.

Figure 3:
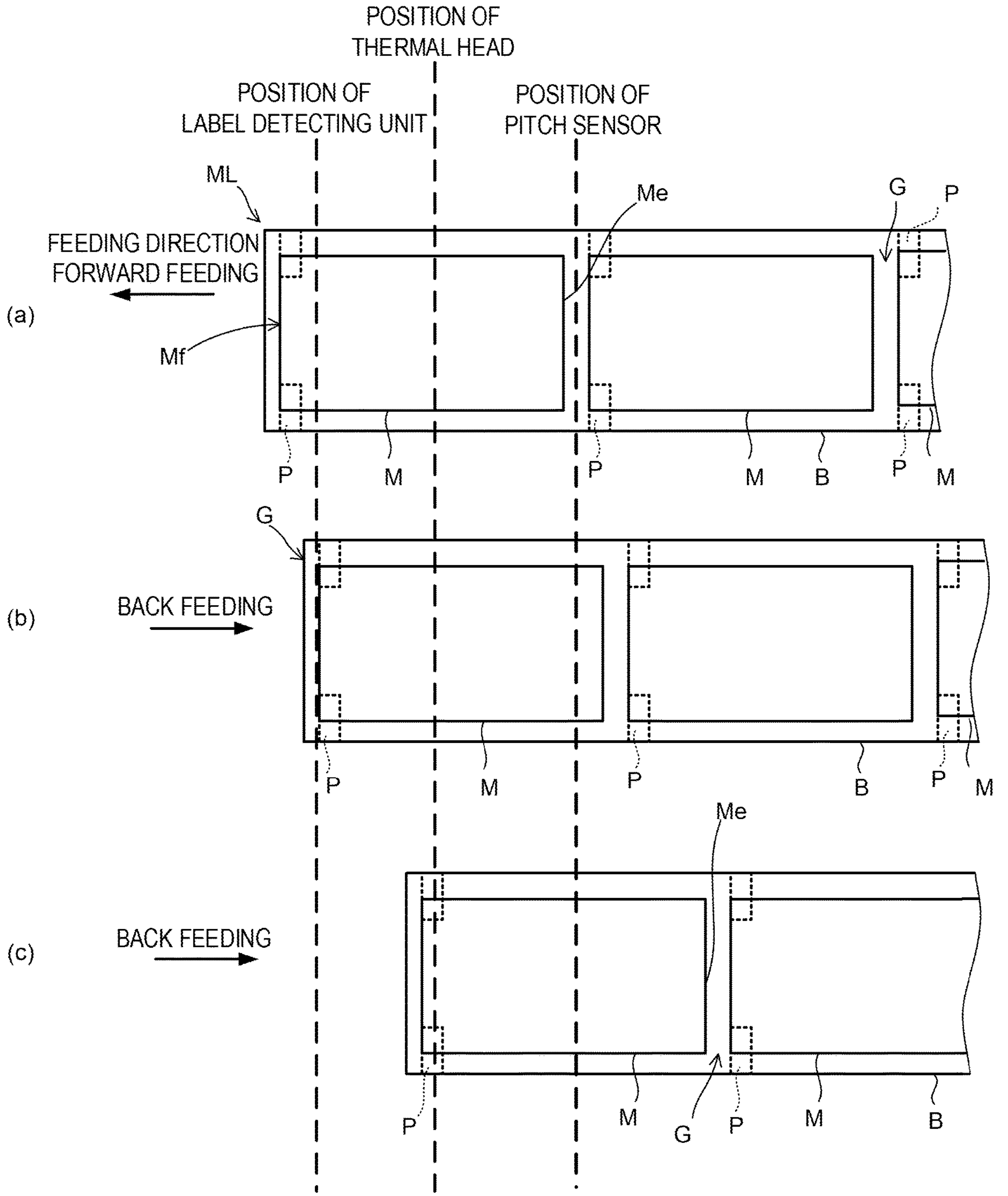
FIG. 3 illiterates a diagram of a continuous body, a position of a label detecting unit in the printer, and a position of a thermal head.

FIG. 3 illustrates a diagram of the continuous body ML, a position of the label detecting unit 50 in the printer 1, and a position of the thermal head 13.

As illustrated in FIG. 3 (*a*), the continuous body ML is composed of the belt-like liner B and a plurality of labels M temporarily attached on the liner B. On the back side of the liner B, an eye-mark P for detecting a pitch of the label M is pre-printed at a position corresponding to the tip of the downstream side of the label M in the feeding direction. Further, the labels M are arranged continuously in the feeding direction with a predetermined gap (gap G).

The pitch detecting unit 60 can detect the relative position of the label M to the printing portion 15 by detecting the eye-mark P or the gap G printed on the continuous body ML. Also, this allows the printer 1 to sequentially execute the operation of feeding the continuous body ML until the printing start position of the label M corresponds to the thermal head 13 and printing from the printing start position of the label M.

By the way, in the printer 1, when a new continuous body ML is set on the medium feeding shaft 40 and printing is started, or when the thermal head 13 is set to the head opening position and then returned to the head closing position and printing is restarted, or the little, in order to accurately print on the first label M of the set continuous body ML, the label detecting unit 50 is required to be able to accurately detect the end portion Mf of the first label M in the downstream side of the feeding direction.

It is possible to leave the positioning of the continuous body ML on the printer 1 to the user, but in that case, it is difficult for the user to set the continuous body ML so as to be positioned the end portion Mf of the label M on predetermined position of the printer 1. Also, it is not desirable from the viewpoint of printing accuracy for the user to set them.

On the other hand, the printer 1 is equipped with a configuration that can detect the end portion Mf at the downstream side of the feeding direction of the label M if the continuous body ML is set by the user to a rough position, for example, as illustrated in FIG. 3(*a*).

The printer 1 of present embodiment, as illustrated in FIG. 3(*a*), detects the end of the label Mf by back feeding from the state where the first label M is set in the position where it can be detected by the label detecting unit 50, as illustrated in FIG. 3(*b*). Then, the printer 1 executes the following process in the label detecting unit 50 in order to improve the accuracy of detecting the position of the end portion Mf.

[A First Control of the Label Detecting Unit by the Printer]

FIG. 4 illustrates a flowchart illustrating the first control of the label detecting unit 50 according to the printer according to one embodiment of the present invention. Hereinafter, the operation of the printer 1 will be described with reference to FIG. 4.

When the controller 70 detects that the cover 3 is set to the closed position and the head unit 11 is set to the head closing position, it starts the process of adjusting the output voltage in the label detecting unit 50 illustrated in FIG. 4.

At Step S1, the controller 70 controls the label detecting unit 50 to emit the detecting light from the light-emitting portion 51.

At Step S2, the controller 70 determines whether a detected voltage based on a detecting light in the light-receiving portion 52 is larger than a reference value.

Here, the reference value is a value of the output voltage from the label detecting unit 50 set in advance in the printer 1 to determine that the label M has been set to the label detecting unit 50 position (the state illustrated in FIG. 3 (*a*)).

The reference value can be set, for example, the output voltage value that is output from the label detecting unit 50 when the detecting light is emitted at the predetermined light emitting output to a reference liner for setting the reference value and is received through the reference liner. The reference value, for example, is set at a factory when the printer 1 is shipped. The various settings made at the factory are called a master registration. In practice, the light-emitting output in the light-emitting portion 51 is set so that the output voltage from the label detecting unit 50 by the detecting light through the reference liner becomes the reference value.

In addition, the reference value is set high so that all labels of different materials, thicknesses and colors can be detected at the stage before adjusting the light emitting output of the light-emitting portion 51 by the output voltage adjustment process described in FIG. 4 when the head unit 11 is set to the head closing position. The reference value is stored in the ROM 72.

If the controller 70 determines at Step S2 that the detected voltage based on the detecting light in the light-receiving portion 52 is less than the reference value (Step S2, No), the controller 70 proceeds to Step S3. This corresponds to a state in which no label M is in the continuous body ML (e.g., the liner B) or a state in which there is no continuous body ML is detected.

At Step S3, the controller 70 generates a signal for an error notification to the user. As the error notification, for example, a message such as "Please set the continuous body ML" or "Please re-set the continuous body ML to the correct initial position" may be displayed in the display portion 81.

The controller 70, at Step S2, if detected voltage based on the detecting light in light-receiving portion 52 is determined to be larger than reference value (Step S2, Yes), the process proceeds to the process after Step S4. This corresponds to the case where the label M in the continuous body ML is detected by the label detecting unit 50 when the head unit 11 is set to the head closing position.

Subsequently, the controller 70 adjusts the light emitting output at the light-emitting portion 51 at Step S4. That is, the controller 70 adjusts the light emitting output of the detecting light in the light-emitting portion, so as to bring an output voltage from the label detecting unit 50 when the light-receiving portion 52 receives a detecting light through the liner B to which the label M is not temporarily attached, closer to an output voltage from the label detecting unit 50 when the light-receiving portion 52 receives a detecting light through a state in which there is no label continuous body ML between the light-emitting portion 51 and the light-receiving portion 52.

Specifically, in the present embodiment, the controller 70 adjusts the light emitting output at the light-emitting portion 51 so as to reduce the output voltage from the label detecting unit 50 by the detecting light through the label M from a reference value to a specific value.

As a result, the output voltage from the label detecting unit 50 when the detecting light is received through the liner B in the light-receiving portion 52 can be shifted to the lower limit and set to the proper value.

Here, the specific value is a value for adjusting that the output voltage from the label detecting unit 50 when the detecting light is received through the liner to which the label is not temporarily attached becomes the output value from the label detecting unit 50 when the detecting light is received a detecting light through the state in which there is no label continuous body between the light-emitting portion 51 and the light-receiving portion 52.

The specific value is a value determined based on the actual detected voltage by emitting the detecting light to multiple types of labels. And the specific value is an output voltage that can be determined to be label M, regardless of the materials, thickness, colors or the like of the label M, and can be determined to a specific constant value.

In the present embodiment, the reference value of the output voltage is set to be higher. In other words, in the present embodiment, the light emitting output of the light-emitting portion 51 for obtaining the reference value is set high, and the light-emitting portion 51 is adjusted in the direction of decreasing the light emitting output.

After Step S4, the controller 70 causes the light-emitting portion 51 to emit light at the adjusted light emitting output.

In subsequent Step S5 to S6, the controller 70 detects the end portion Mf of the label M.

Specifically, in Step S5, the controller 70 determines whether the detected voltage based on the detecting light received by the light-receiving portion 52 reaches the threshold value at Step S6 every time the platen roller 12 is back-fed for one step. The controller 70 counts the number of steps of back feeding.

If the controller 70 determines at Step S6 that the detected voltage based on the detecting light in the light-receiving portion 52 has not reached the threshold value (Step S6, No), the controller 70 proceeds to Step S7.

At Step S7, the controller 70 determines whether a back feeding amount has reached the acceptable value. If the back feeding amount is acceptable value, the operation from Step S5 can be repeated.

In the present embodiment, the medium feeding shaft 40 is not equipped with a driving unit. Therefore, when the continuous body ML is treated with back feed, a wave-like flexure may occur upstream of the printing unit 10.

Therefore, for example, if the position close to the upstream end portion Me of the first label M is set to correspond to the label detecting unit 50, the back feeding distance required until the downstream end portion Mf is detected may become longer.

In such a case, as the back feeding distance of the continuous body ML becomes longer, the flexure of the continuous body ML becomes remarkable, which may cause the label M to peel off from the liner B or the continuous body ML to bend. As a result, when the continuous body ML is treated with forward feeding again, a failure of feeding is likely to occur.

On the other hand, in the present embodiment, the back feeding amount is determined at Step S7, and if the back feeding amount exceeds the acceptable value, it is determined that there is a high possibility that the continuous body ML will become defective inside the printer 1, and the operation to detect the end portion Mf is stopped.

If the back feeding amount exceeds the acceptable value at Step S7, the controller 70 generates a signal to inform the user of the error at Step S8 and stops the operation to detect the end portion Mf. As the error notification, for example, a message such as "Please set the continuous body ML in the correct position" may be displayed in the display portion 81.

If the controller 70 determines at Step S6 that the detected voltage based on the detecting light at the light-receiving portion 52 has reached the threshold value (Step S6, Yes), the controller 70 proceeds to Step S9.

At Step S9, the controller 70 stops the back feeding of the continuous body ML (FIG. 3(*b*)) and identifies this position as the end portion Mf in the downstream side of the feeding direction of the label M.

At Step S10, the controller 70 executes the back feeding (FIG. 3(*c*)) from the end portion Mf of the label M identified at Step S9 to the printing start position based on the print data, and then proceeds to Step S11 to start the printing process.

<Effect of the First Control>

In the past, the printer has configuration for detecting the following three states in the continuous body ML. The three states are: (1) the label M and the liner B exist, (2) the liner B only exist, and (3) nothing is exist. In contrast, in the printer 1 of this embodiment, based on the technical ideas that it is sufficient to detect two states, (1) the label M and the liner B exist, and (2) only liner B or nothing exist, the controller 70 adjusts the light emitting output of the detecting light in the light-emitting portion 52, so as to bring an output voltage Vbb from the label detecting unit 50 when the light-receiving portion 52 receives a detecting light through the liner B to which the label M is not temporarily attached, closer to an output voltage $V_0$ from the label detecting unit 50 when the light-receiving portion 52 receives a detecting light through a state in which there is no label continuous body ML between the light-emitting portion 51 and the light-receiving portion 52.

That is, the controller 70 adjusts the output voltage from the label detecting unit 50 by the detecting light through the label M so as to be the specific value determined based on the actual detected voltage detected by emitting the detecting light to a plurality of types of label.

The printer 1 detects the end portion Mf of the label M by emitting the light-emitting portion 51 with the adjusted light emitting output. Thus, it is possible to suppress the light emitting output of the detecting light in the light-emitting portion 51 to proper value.

Therefore, according to the printer 1, unnecessary diffraction, unnecessary reflection, unnecessary diffusion or the like of the detecting light during detection of the label M, which are caused by the excess of the light emitting output, can be reduced. This can suppress the fluctuation of the detecting light in the light-receiving portion 52.

Therefore, the controller 70 can more easily detect the displacement of the output voltage from the label detecting unit 50 and improve the accuracy of label detection.

Figure 5:
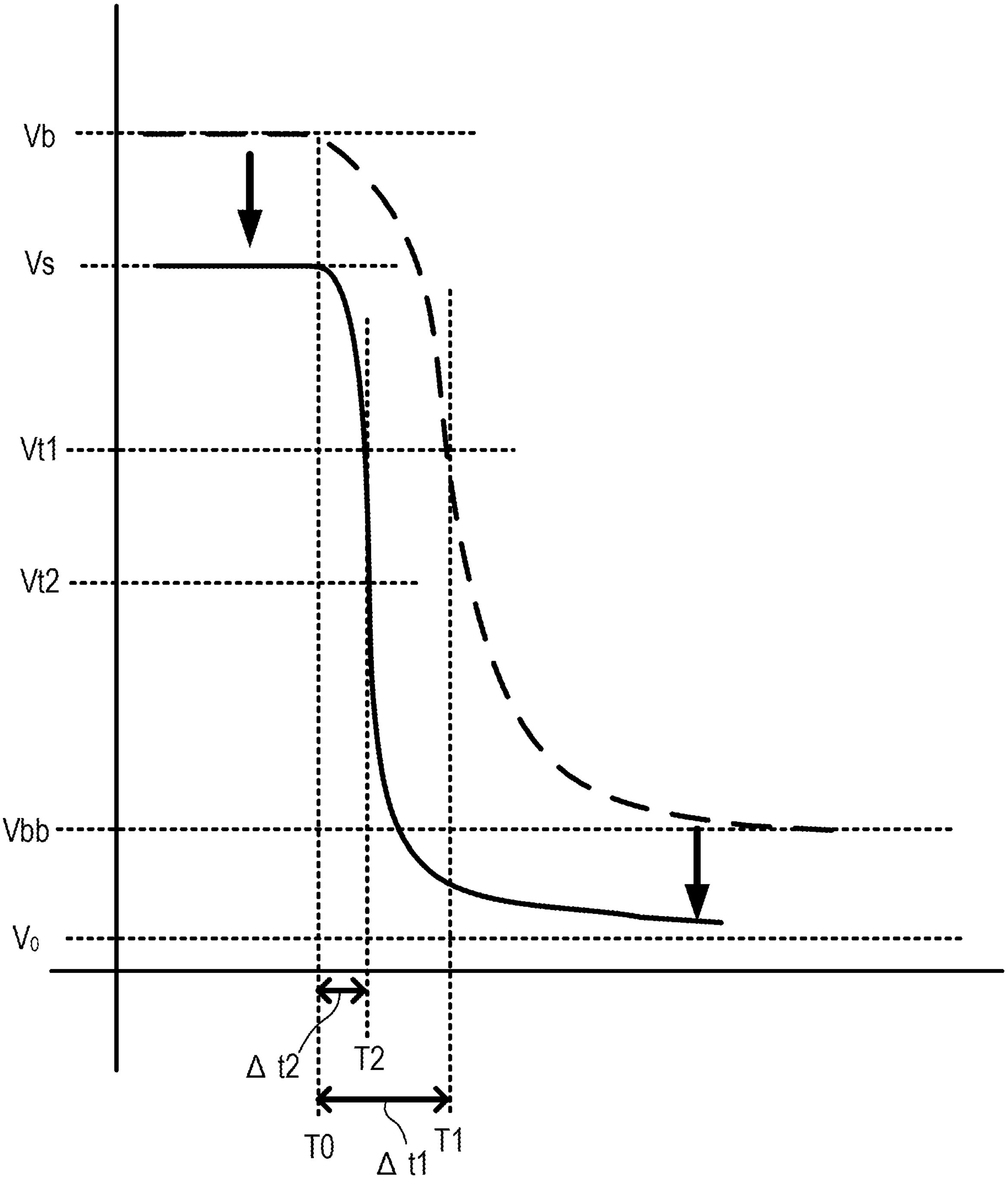
FIG. 5 illustrates a diagram illustrating a relation between a change in an output voltage from the label detecting unit and a feeding amount.

FIG. 5 illustrates a diagram illustrating a relation between a change in the output voltage from the label detecting unit 50 and a feeding amount.

In the FIG. 5, the change in the output voltage when the output voltage from the label detecting unit 50 is adjusted is represented by a continuous line. Also, the change in the output voltage when the output voltage from the label detecting unit 50 is not adjusted is represented by a broken line.

In the printer 1 according to the present embodiment, the controller 70 decreases the output voltage from the reference value Vb until it reaches the specific value Vs, so as to bring an output voltage Vbb from the label detecting unit 50 when the light-receiving portion 52 receives a detecting light through the liner B to which the label M is not temporarily attached, closer to an output voltage $V_0$ from the label detecting unit 50 when the light-receiving portion 52 receives a detecting light through a state in which there is no label continuous body ML between the light-emitting portion 51 and the light-receiving portion 52. In this way, when the output voltage is adjusted to the specific value Vs, a decrease in the output voltage from the label detecting unit 50 can be detected steeply when the transition from the label M to the liner B is made.

On the other hand, if the light emitting output in the light-emitting portion 51 is not adjusted, the decrease in the output voltage from the label detecting unit 50 is detected slowly when the transition from the label M to the liner B is made.

In the latter case, the detecting light in the light-emitting portion 51 is over-output, and unnecessary diffraction, unnecessary reflection, and unnecessary diffusion or the like occur when the detecting light passes through the label M. This causes the variation of the detecting light in the light-receiving portion 52.

In contrast, in the printer 1 according to the present embodiment, it seems that the influence of unnecessary diffraction, unnecessary reflection, and unnecessary diffusion or the like occur when the detecting light passes through the label M are decreased, by light emitting output in the light-emitting portion 51 is set to proper value.

In the printer 1, when the output voltage is adjusted (the continuous line), the decrease in output voltage from the label detecting unit 50 is detected steeply. As a result, the feeding amount Δt2 from Step T0 when the decrease in the output voltage starts to be detected to Step T2 when the output voltage reaches to the threshold value Vt2 is become shorten than the feeding amount Δt1 from Step T0 when the decrease in the output voltage starts to be detected to Step T2 when the output voltage reaches to the threshold value Vt1, when the output voltage is not adjusted (the dotted line).

In other words, the controller 70 can determine that it is the end portion Mf of the label M in a short period of time. Therefore, the accuracy of detecting the end portion Mf of the label M can be improved.

Further, when the light emitting output in the light-emitting portion 51 is adjusted, the decrease in the output voltage from the label detecting unit 50 is detected steeply, and the change in the output voltage does not fluctuate from near the lower limit after a predetermined period of time or longer. In other words, the output voltage from the label detecting unit becomes saturated.

Therefore, the threshold value of the output voltage, which is the criterion for determining whether it is the end portion Mf of the label M, can be set to a high value. In other words, the difference value between the specific value Vs and the threshold value Vts can be set to a small value. For example, the controller 70 can set the threshold value Vt2 to half-value of the specific value Vs.

By setting the threshold value in this way, it is possible to shorten the feeding amount Δt2 until reaching the threshold value Vt2. Therefore, it is possible to shorten the time required for determining that the end portion Mf of the label M.

Further, the printer 1 according to the present embodiment is set to stop the operation of detecting the end portion Mf when the back feeding amount until the end portion Mf of the label M is detected exceeds the acceptable value. Thus, this prevents the label M from peeling off from the liner B and the continuous body ML from bending, which may result from the longer distance of the continuous body ML performed back feeding.

[A Second Control of the Label Detecting Unit by the Printer]

Figure 6:
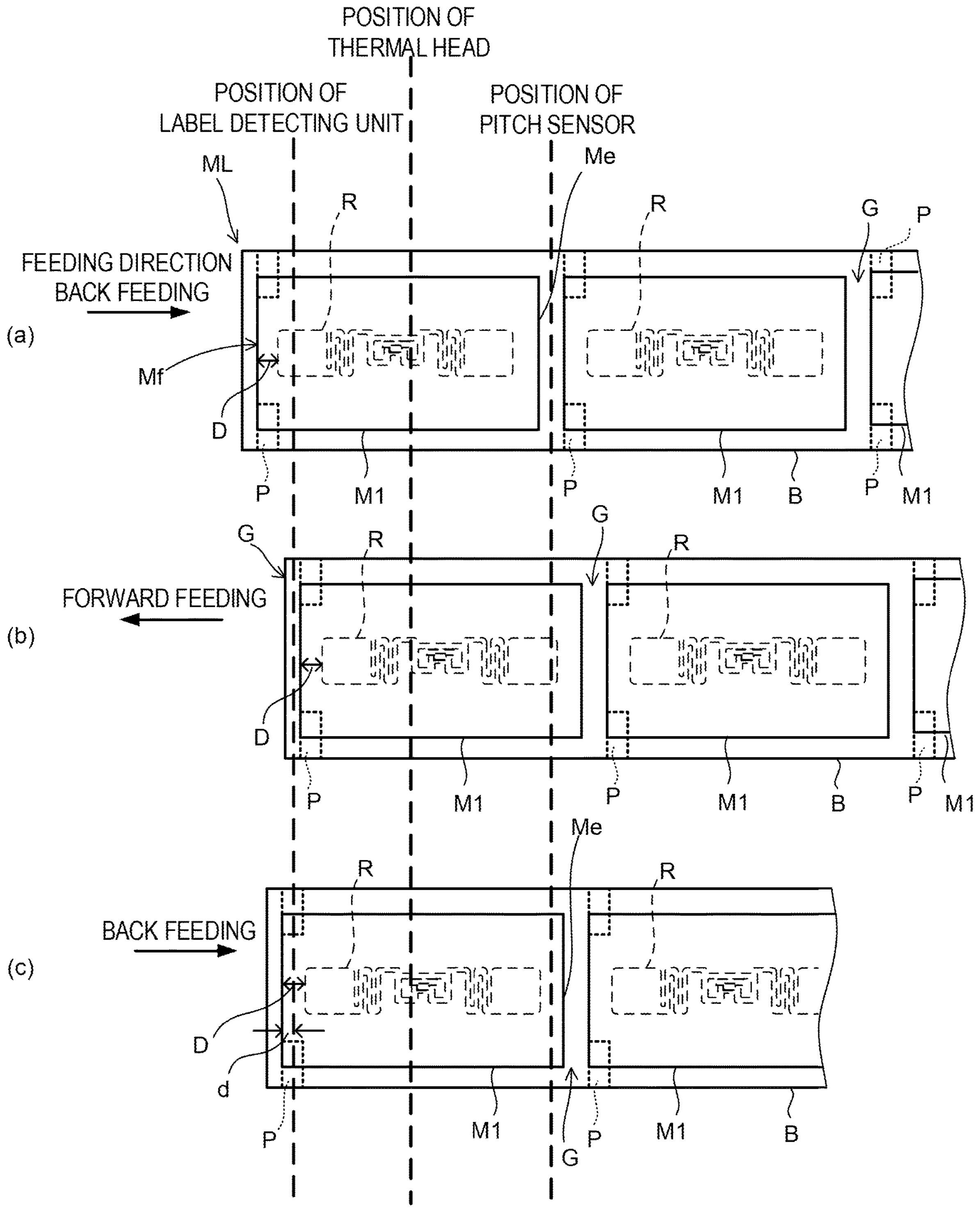
FIG. 6 illustrates a diagram of the continuous body attached a RFID label contained a RFID inlay temporarily, the position of the label detecting unit in the printer, and a position of the thermal head in the printer.

For example, a RFID label M1 containing a RFID inlay R may be used. FIG. 6 illustrates a diagram of the continuous body ML attached the RFID label contained the RFID inlay temporarily, the position of the label detecting unit 50 in the printer 1, and a position of the thermal head 13 in the printer 1.

Figure 7:
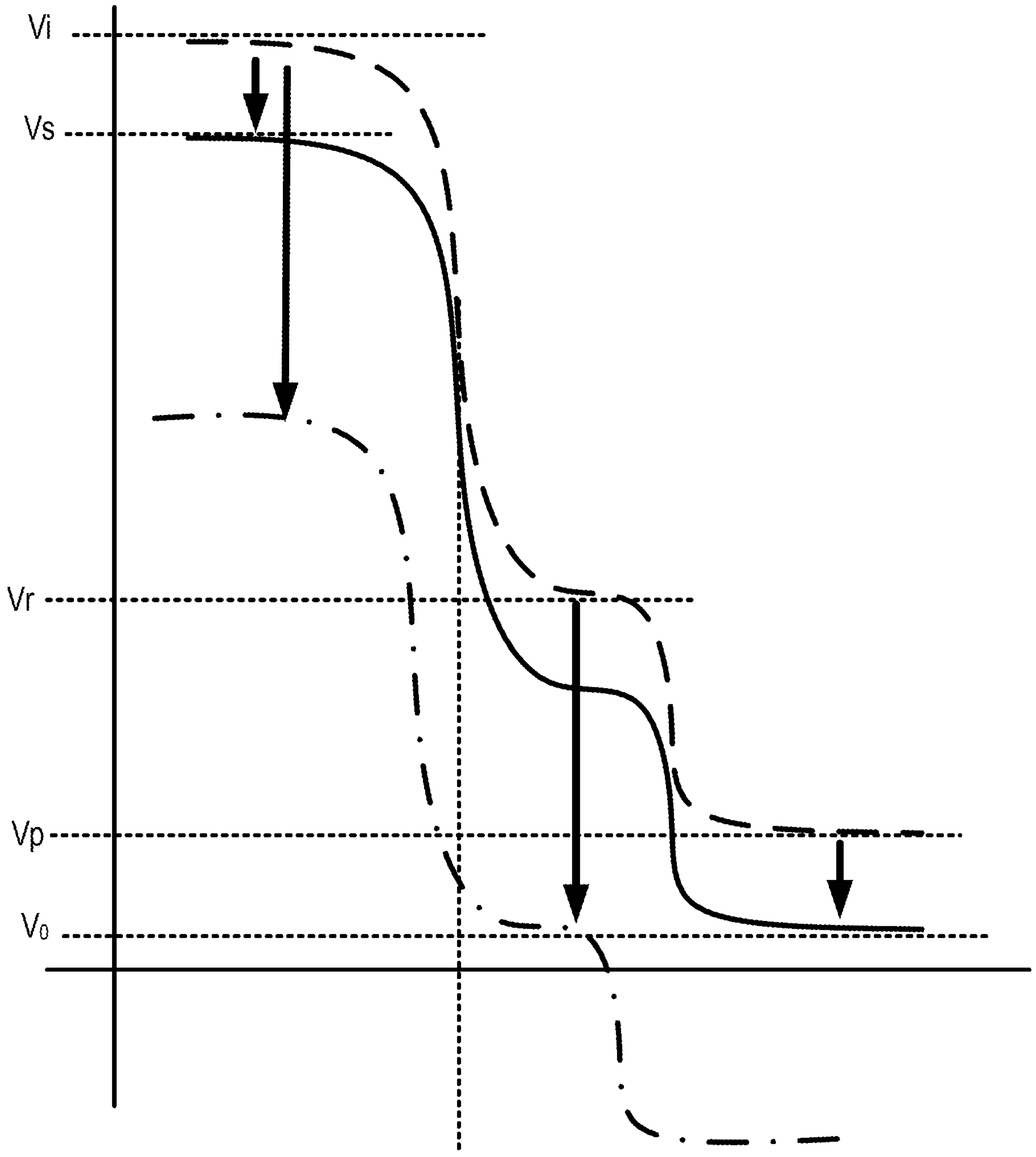
FIG. 7 illustrates a schematic diagram illustrating the relationship between the changes in the output voltage from the label detecting unit and the feeding amount when using an RFID label.

Also, FIG. 7 illustrates a schematic diagram illustrating the relationship between the changes in the output voltage from the label detecting unit 50 and a feeding amount when using a RFID label.

In FIG. 7, a broken line represents the change in the output voltage when the output voltage from the label detecting unit 50 is not adjusted.

In this broken curve line, the voltage level Vi due to the detecting light through the RFID inlay R, a label substrate, and the liner B, the voltage level Vr due to the detecting light through the label substrate and the liner B, without the RFID inlay R, and the voltage level Vp due to the detecting light detected through the label substrate are appearing.

Also, in FIG. 7, the continuous line represents the change in the output voltage when the output voltage from the label detecting unit 50 can be adjusted in an ideal manner. That is, it represents the case of that the output voltage Vp when received the detecting light through the liner B to which the RFID label M1 is not temporarily attached can close to the output voltage $V_0$ when received the detecting light through a state in which there is no label continuous body ML between the light-emitting portion 51 and the light-receiving portion 52.

However, in the continuous body ML in which the RFID label M1 is contained, when adjusting the light emitting output in the light-emitting portion 51 only by the first control, as illustrated in FIG. 6(*a*), the detecting light from the label detecting unit 50 may be irradiated at a position overlapping the RFID inlay R in the RFID label M1.

The one dot chain curve line in FIG. 7 shows the change in output voltage when the detecting light detected through the RFID inlay R, the label substrate, and the liner B (detecting light at the position in FIG. 6(*a*)) is misdetected as the detecting light detected through the label substrate and the liner B.

If the misdetection occurs, the light output of the detection light in the light emitting section 51 is adjusted so that the output voltage Vr when the detecting light is received through the liner B and the label substrate that does not contain the RFID inlay R, is brought closer to the output power $V_0$ when there is no continuous body ML between the light-emitting portion 51 and the light-receiving portion 52, instead of the output voltage Vp when the detecting light is received through the liner B to which the RFID label M1 is not temporarily attached.

For this reason, as shown as the one dot chain line of FIG. 7, the output of the detecting light will be adjusted excessively low, the border between the RFID label M1 and the liner B may not be detected correctly.

Therefore, the printer 1, prior to the first control, when the adjustment process of the light emitting output, the second control for feeding the continuous body ML is executed so that the detecting light is irradiated to specific position does not overlap with the RFID inlay R (hereinafter, referred to as adjustment position).

In other words, the printer 1 detects the end portion Mf on the downstream side of the RFID label M1 in the feeding direction by using the detecting light before adjusting the light emitting output. After detecting the end portion Mf, the procedure of the forward feeding the continuous body ML for a predetermined number of steps is executed so that the detecting light is irradiated at the adjusted position.

In the present embodiment, it is assumed that the adjustment position is set in advance on the RFID label M1. Here, the adjustment position is a position that does not overlap with an inlay substrate or an antenna that constitutes the RFID inlay R in the RFID label M1 in which the RFID inlay R is contained. For example, in the design specifications of the RFID label M1, it is specified that the RFID inlay R should be placed within a predetermined width D from the end portion Mf.

Further, in the present embodiment, the predetermined step number is a number of steps by the stepping motor, from the end portion Mf of the RFID label M1 to the adjustment position set within the RFID label M1.

Figure 8:
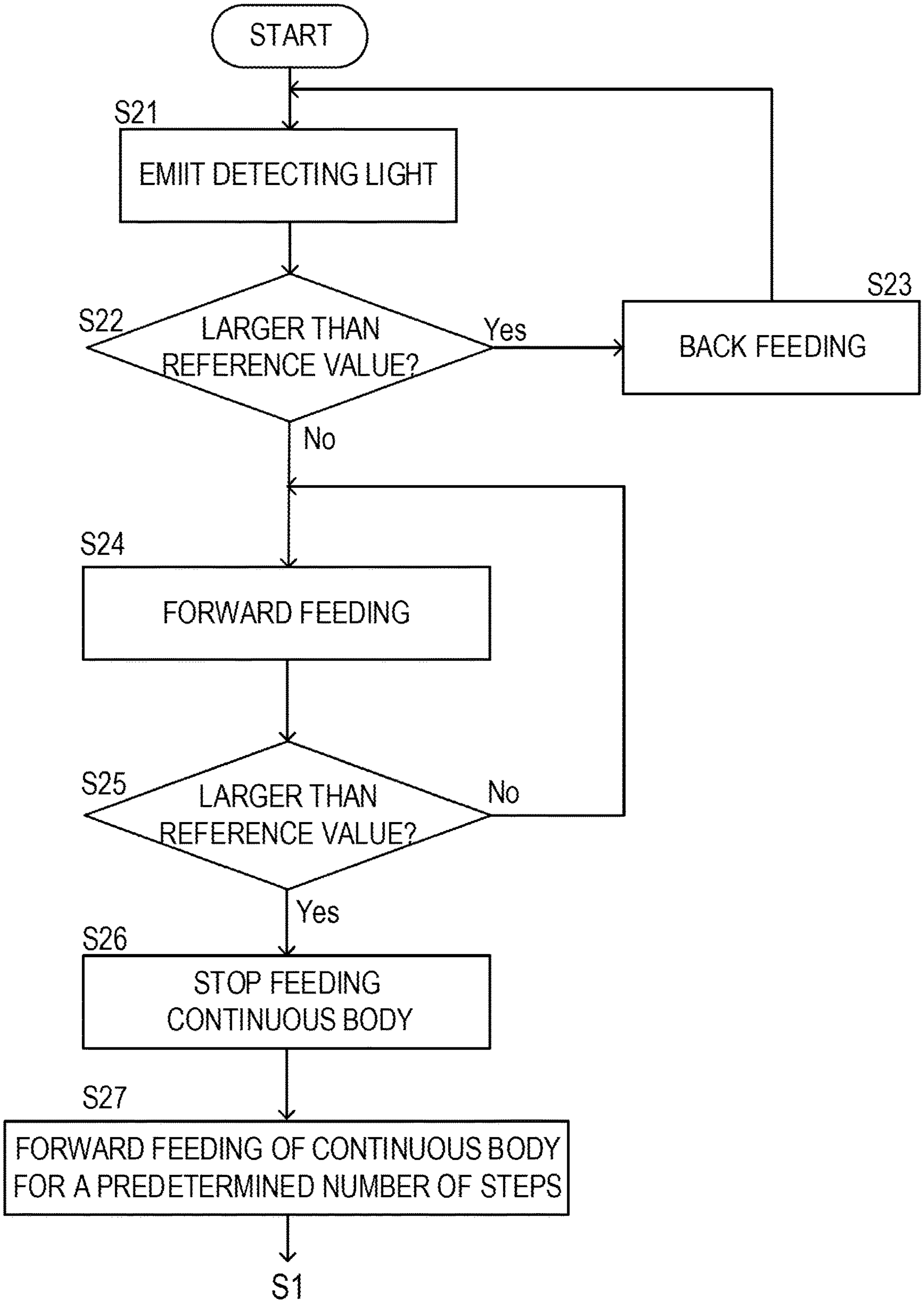
FIG. 8 illustrates a flowchart illustrating a second control of the label detecting unit according to the printer according to the embodiment of the present invention.

FIG. 8 illustrates a flowchart illustrating the second control of the label detecting unit 50 according to the printer 1. Hereinafter, Referring to FIG. 8, the operation of the printer 1 will be described.

The second control illustrated in FIG. 8, when the controller 70 detects that the cover 3 is set in the closed position and the head unit 11 is set in head closing position, is executed prior to Step S1 illustrated in FIG. 4.

Initially, at Step S21, the controller 70 controls the label detecting unit 50 to emit the detecting light from the light-emitting portion 51. The detecting light at this time is irradiated with the power prior to adjusting the light emitting output, and the detected voltage of the detecting light at the light-receiving portion 52 becomes the reference value.

At Step S22, the controller 70 determines whether the detected voltage based on the detecting light in the light-receiving portion 52 is larger or smaller than the reference value. If it is determined to be larger than the reference value (Step S22, Yes), the controller 70 proceeds to Step S23, and to executes the back feeding of the continuous body ML. This corresponds to the case where the overlap between the label substrate and the liner, or the overlap between the RFID inlay R, the label substrate and the liner (other than the case where only the liner is detected) is detected.

Specifically, at Step S23, the controller 70 every time the platen roller 12 is performed to back feeding for one step, emits the detecting light at Step S21, and repeats the determination at Step S22. Here, if the controller 70 does not detect a value smaller than the reference value (only the liner) even after back feeding for a predetermined number by repeating Steps S22 and S23, for example, "Please set the continuous body ML" or "Please set the continuous body ML to the correct initial position again" may be displayed on the display portion 81 as an error message.

If the controller 70 determines at Step S22 that the detected voltage based on the detecting light at the light-receiving portion 52 is less than the reference value (Step S22, Yes). In other words, when a liner is detected, the process is shifted to Step S24 or later.

At Step S24, the controller 70 sends a control signal to the feeding control circuit 74, and irradiates the detecting light so as to find the end portion Mf of the RFID label M1 in the continuous body ML, while performing the forward feeding (FIG. 6(*b*)).

At this time, the controller 70 causes the label detecting unit 50 to detect the end portion Mf of the RFID label M1 by using the detecting light whose detected voltage is the reference value based on the detecting light in the light-receiving portion 52 (FIG. 6(*b*)).

The controller 70 repeats Steps S24 and S25 until the detected value is larger than the reference value, that is, the end portion Mf of the RFID label M1 is detected. At Step S25, if the end portion Mf of the RFID label M1 is detected (Step S25, Yes), the controller 70 proceeds to Step S26 and stops feeding of the continuous body ML.

Then, the controller 70 sends a control signal to the feed control circuit 74 in Step S27 to perform the forward feeding of the continuous body ML forward for a predetermined number of steps to make it a predetermined width d (D>d)

until the irradiation position of the detection light corresponds to a predetermined adjustment position from the end Mf of the RFID label M1.

After the controller 70 executes the predetermined number of steps of the forward feeding, the process shown in Steps S1 to S11 in FIG. 4 is executed.

<Effect of the Second Control>

According to the present embodiment, the continuous body ML is fed until the detecting light is irradiated to the adjustment position set on the RFID label M1 before the detection light is adjusted to the appropriate output. This means that, for example, even when the RFID label M1 included the RFID inlay R is used, the adjustment of the light emitting output can be started after alignment to the preset adjustment position of the RFID label M1, the light emitting output can be adjusted appropriately.

Therefore, even when the RFID label M1 is used, it does not misdetect the end portion Mf of the RFID label M1 and the end portion of the RFID label M.

[A Control Method of the Printer]

A control method of the printer according to the present embodiment, is adjusting the light emitting output of the detecting light in the light-emitting portion, so as to bring an output voltage from the label detecting unit 50 when the light-receiving portion 52 receives a detecting light through the liner B to which the label M is not temporarily attached, closer to an output voltage from the label detecting unit 50 when the light-receiving portion 52 receives a detecting light through a state in which there is no label continuous body ML between the light-emitting portion 51 and the light-receiving portion 52. The control method of this printer is achieved by the printer 1 described above.

Other Embodiments

Although the embodiments of the present invention have been described in the above, the above-mentioned embodiments merely illustrate a part of application examples of the present invention, and the technical scope of the present invention is not intended to be limited to the specific constitutions of the above-described embodiments.

In the present embodiment, it described that the ink ribbon transfer printer 1 using the thermal head 13, but it can also be a thermal transfer printer using thermal transfer, where the label M is thermal paper and the printer 1 prints on the label M by applying heat to the thermal head 13.

In the printer 1 of this embodiment, the reference value Vb of the output voltage from the label detecting unit 50 by the detecting light through the label M is set higher than the specific value Vs, and The printer 1 has a configuration to adjust the output voltage in the direction of lowering the output voltage. On the contrary, the reference value Vb before being optimized is set to be lower than the specific value Vs, and the output voltage may be adjusted in the direction of increasing it so that it becomes the specific value Vs.

The controller 70 may change the threshold value Vt2 of output voltage to determine that the end portion Mf of the label M has been detected, automatically depending on the brightness of the installed environment, or by user setting. This makes it possible to eliminate variations in the accuracy of the label M detection due to the installation location of the printer 1.

The flowchart illustrated in FIG. 4 is a process that assumes that the label M is set to the position corresponding to the label detecting unit 50, as illustrated in FIG. 3(*a*).

In contrast, the controller 70 can also detect the end portion Mf by forward feeding from the state that the gap G between labels M set to the position corresponding to the label detecting unit 50 when the head unit 11 is set to the head closing position.

In actual continuous body ML, the gap G between labels M is often set to be significantly shorter than the length of each label M in the feeding direction. Therefore, it is simpler for the user to align the label M to the position corresponding to the label detecting unit 50.

This application claims priority based on Japanese Patent Application No. 2019-057433 filed with the Japan Patent Office on Mar. 25, 2019, and JP 2020-050867 filed with the Japan Patent Office on Mar. 23, 2020 the entire contents of which are incorporated into this specification by reference.

The invention claimed is:

1. A printer for printing on a label continuous body including a label temporarily attached to a belt-like liner, comprising:

a label detecting unit having a light-emitting portion configured to emit a detecting light and a light-receiving portion configured to receive the detecting light; and a control unit configured to adjust a light emitting output of the detecting light in the light-emitting portion to bring (i) an output voltage from the label detecting unit when the light-receiving portion receives the detecting light through the liner without the label closer to (ii) an output voltage from the label detecting unit when the light-receiving portion receives the detecting light through a state in which there is no label continuous body between the light-emitting portion and the light-receiving portion.

2. The printer according to claim 1, wherein:

the control unit is configured to adjust the light emitting output so that an output voltage from the label detecting unit when the light-receiving portion receives the detecting light through the liner and the label becomes a specific value.

3. The printer according to claim 2, wherein:

the specific value is determined such that the output voltage from the label detecting unit when the detecting light is received through the liner without the label is adjusted closer to an output value from the label detecting unit when the detecting light is received through the state in which there is no label continuous body between the light-emitting portion and the light-receiving portion.

4. The printer according to claim 1, wherein:

the control unit is configured to set a threshold value for determining an end portion of the label.

5. The printer according to claim 4, wherein:

the control unit is configured to be able to change the threshold value.

6. The printer according to claim 5, wherein:

the control unit is configured to set a half-value of the specific value as the threshold value.

7. The printer according to claim 1, further comprising:

a thermal head for printing on the label; and a platen roller disposed opposite to the thermal head to hold and feed the label continuous body between the thermal head and the platen roller, wherein;

the label detecting unit is disposed on a downstream side of the thermal head and the platen roller in the feeding direction of the label continuous body.

8. The printer according to claim 7, further comprising:

a cover configured to cover an interior of the printer and configured to be openable and closable; and a sensor configured to detect an opening and a closing of the cover, wherein:

the control unit is configured to cause the light-emitting portion to emit the detecting light when the cover is closed, to set the output voltage from the label detecting unit when the light receiving portion is receiving the detection light through the label and the liner as the specific value, to detect the end portion of the label while feeding the label continuous body, and to stop feeding the label continuous body after the end portion of the label is detected.

9. The printer according to claim 1, wherein:

the control unit is configured to feed the label continuous body so that the detecting light is irradiated to a specific position of the label prior to adjusting the light emitting output.

10. The printer according to claim 9, wherein:

the control unit is configured to irradiate a previous detecting light before the light emitting output is adjusted when irradiating the detecting light to the specific position.

11. A control method for a printer with a label detecting unit having a light-emitting portion configured to emit a detecting light and a light-receiving portion configured to receive the detecting light, the printer configured to print on a label continuous body including a label temporarily attached to a belt-like liner, the control method comprising:

adjusting a light emitting output of the detecting light in the light-emitting portion to bring an output voltage from the label detecting unit when the light-receiving portion receives the detecting light through the liner without the label closer to an output voltage from the label detecting unit when the light-receiving portion receives the detecting light through a state in which there is no label continuous body between the light-emitting portion and the light-eceiving portion.

12. The control method for the printer according to claim 11, further comprising:

feeding the label continuous body so that the detecting light is irradiated to a specific position of the label prior to adjusting the light emitting output.

13. A computer-readable storage medium storing a program for causing a computer installed in a printer with a label detecting unit having a light-emitting portion configured to emit a detecting light and a light-receiving portion configured to receive the detecting light, the printer also configured to print on a label continuous body including a label temporarily attached to a belt-like liner wherein the computer-readable storage medium is configured to:

adjust a light emitting output of the detecting light in the light-emitting portion, and bring an output voltage from the label detecting unit when the light-receiving portion receives the detecting light through the liner without the label closer to an output voltage from the label detecting unit when the light-receiving portion receives the detecting light through a state in which there is no label continuous body between the light-emitting portion and the light-receiving portion.

14. The computer-readable storage medium storing a program for causing the computer installed in the printer according to claim 13, further configured to:

feed the label continuous body so that the detecting light is irradiated to a specific position of the label prior to adjusting the light emitting output.

* * * * *